Oct. 10, 1933. G. E. WILLERS Re. 18,968
WELL STRAINER AND PROCESS OF MAKING SAME
Original Filed March 23, 1928
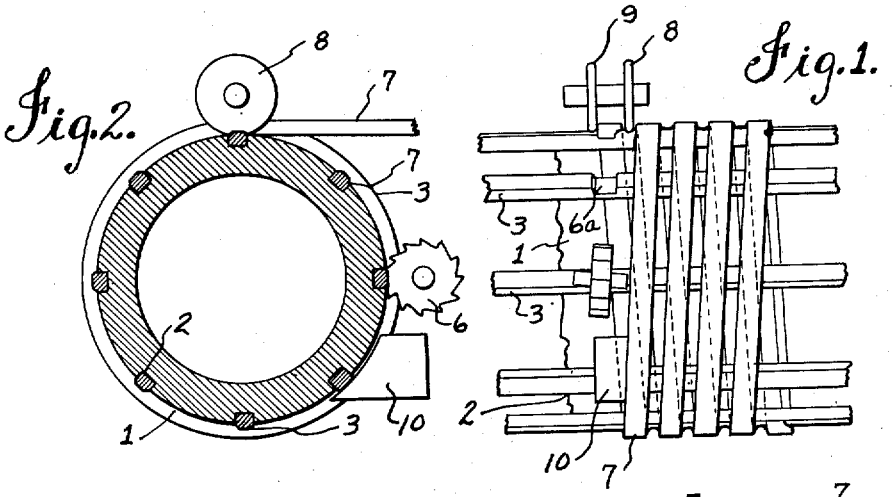
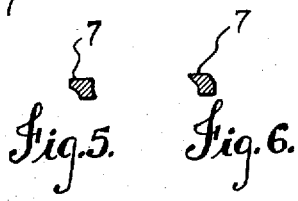
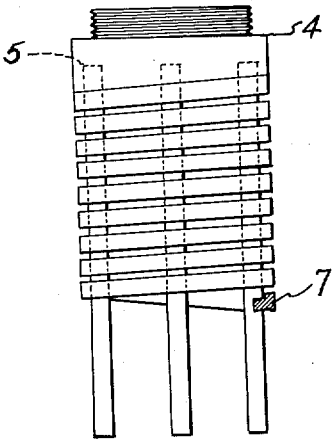
Fig. 3.
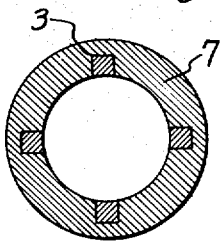
Fig. 4.
INVENTOR.
George E. Willers
BY
Allen & Allen
ATTORNEY.

Reissued Oct. 10, 1933 Re. 18,968

UNITED STATES PATENT OFFICE 18,968

WELL STRAINER AND PROCESS OF MAKING SAME

George E. Willers, Lawrenceburg, Ind., assignor to A. D. Cook, Inc., Lawrenceburg, Ind., a corporation of Indiana Original No. 1,763,996, dated June 17, 1930, Serial No. 264,221, March 23, 1928. Application for reissue June 16, 1932. Serial No. 617,616

12 Claims. (Cl. 29—163.5)

My invention relates to a process for making well strainers and to a novel type of well strainer made by said process.

In the art it is old, to provide a well strainer for deep wells, which consists of a self-sustaining framework with spirally wound wire secured around the framework with filtering orifices thus provided between the interspaced wires. The method of manufacturing such strainers, is to provide grooved ribs with header members and to then wrap wire spirally around the ribs and to calk the metal of the ribs so that it will firmly retain the wires which provide the filtering area.

I have provided an improved process for making such strainers which, as a process is much simpler than my old process, and which provides a well strainer of improved construction. It is my object, therefore, to provide an improved process for making a well strainer which, as the specification develops, will be shown to possess many marked improvements both in the quality of the work done and in the simplicity of carrying out the process of manufacture.

The above and other objects to which reference will be made in the ensuing description I accomplish by employing those certain steps in the manner hereinafter specified, which result in a pronounced advance in the art relating to such types of equipment.

Referring to the drawing:—

Figure 1 is a side elevation of a well strainer in process of manufacture being made in accordance with my novel process.

Figure 2 is a sectional view of the parts shown in Figure 1.

Figure 3 is a side elevation of a strainer when partially completed.

Figure 4 is a sectional view of the strainer shown in Figure 3.

Figures 5 and 6 show sectional views of preferred types of strainer wire which may be used in the manufacture of screens in accordance with my process.

In carrying out my process I provide a mandrel 1 or other core which preferably has grooves 2 within which the longitudinal ribs 3 may be secured. A header or coupling piece such as that indicated at 4 in Figure 3, and which has grooves 5 within which the ribs may be welded, is then secured in place. It will be obvious that the coupling piece may be first mounted on the mandrel prior to the insertion of the ribs in the grooves in the header, so that the sequence of these several operations forms no part of my invention. The mandrel is then rotated and a rotating saw such as the one diagrammatically indicated at 6 begins to cut grooves 6*a* in the ribs within which the several turns of the spirally wound wire 7 may be secured. The filtering wire, shortly prior to the start of the groove cutting operation, is welded either against the lower surface of the coupling piece or in a slot formed therein. Next a spacing disc 8 and calking wheel 9 are started in operation and the filtering wire is seated in the slots or grooves formed by the saw, the turns are spaced apart by the spacing disc, and the calking wheel 9 treats the metal of the ribs so as to permanently secure the wires within the grooves in the ribs.

Thus the three operations of groove cutting in the longitudinal ribs, spacing the distance apart of the filtering wires, which of course, controls the size of the filtering area, and calking the filtering wires within the grooves is carried out in a continuous successive manner.

A shoe as indicated at 10 may be attached to the carriage and the carriage may mount the notch cutter, spacing disc and calking wheel. The shoe may be made to bear against the side of the wound wire and thus propel the carriage forward as the winding progresses.

When the wire has reached approximately to the outer ends of the ribs, it is cut off and the end is soldered or welded in position against another header which may be of similar shape as the header adjacent the end where starting operations begin. In this manner a process which allows continuous manufacture of a strainer of desired length and diameter is provided which avoids difficulties which were formerly encountered in making self-sustaining strainers of this type.

If the ribs were first grooved, and the filtering wire was then inserted in the grooves loop by loop, and the calking operation was then carried out, the lower edge of each groove would be somewhat battered by the calking operation so that after calking one loop the wire would not seat properly within the next succeeding groove. It will be apparent that difficulties from such a source are done away with in carrying out the operations of manufacture as have been noted.

The strainer itself is an improved article of manufacture inasmuch as each loop of filter wire is seated in a freshly cut groove. The cutting of each groove a spaced circular distance ahead of the calking tool allows the cut to be made in each rib after the metal which will form the upper wall of the groove has been calked in against the wire.

Having thus described my invention, what I claim as new and desire to secure by Letters Patent, is:—

1. A process for making a well strainer, which consists in mounting a series of ribs on a support and securing a header at one end of the ribs, then in sequence cutting grooves in the ribs in spiral sequence, and a short interval thereafter inserting a filter wire in the grooves and treating the metal of the ribs so as to permanently secure the filter wire within the cut grooves so that a strainer is provided with filtering apertures between the spirally spaced wires.

2. A process for making a well strainer, which consists in mounting a series of ribs on a support and securing a header at one end of the ribs, then in sequence cutting grooves in the ribs in spiral sequence, and a short interval thereafter inserting a filter wire in the grooves and treating the metal of the ribs so as to permanently secure the filter wire within the cut grooves so that a strainer is provided with filtering apertures between the spirally spaced wires, and thereafter removing the header and ribs from the support.

3. A process for making a well strainer, which consists in mounting a series of ribs on a support and securing a header at one end of the ribs, then in sequence cutting grooves in the ribs in spiral sequence, and a short interval thereafter inserting a filter wire in the grooves and treating the metal of the ribs so as to permanently secure the filter wire within the cut grooves so that a strainer is provided with filtering apertures between the spirally spaced wires, and thereafter removing the header and ribs from the support, and securing a bottom header at the open ends of the ribs.

4. A process of making well strainers, which consists in mounting a coupling piece and supporting ribs for the strainer on a mandrel, attaching the end of a continuous filter wire to the coupling piece and successively cutting grooves to seat the wires in one rib after another, and thereafter in sequence inserting, spacing, and calking the wire in the cut grooves.

5. A process of making well strainers, which consists in mounting a coupling piece and supporting ribs for the strainer on a mandrel, attaching the end of a continuous filter wire to the coupling piece, and successively cutting grooves to seat the wires in one rib after another, and thereafter in sequence inserting, spacing, and calking the wire in the cut grooves, and thereafter affixing a header at the ends of the ribs.

6. A process of making a well strainer, which consists in providing a supporting framework, continuously cutting grooves in a spiral formation in the framework, and a short interval thereafter continuously inserting a continuous wire in the grooves, and treating the metal of said framework so as to permanently secure said wire within the cut grooves.

7. A process for making a well strainer, which consists in providing a supporting framework, continuously cutting grooves in a spiral formation in the framework, and then continuously inserting a continuous wire in the grooves, and treating the metal of said framework so as to permanently secure the continuous wire within the cut grooves of each rib in sequence.

8. An improved article of manufacture comprising a deep well strainer having coupling members at the ends thereof with longitudinal ribs spaced therearound and extending between and secured in said coupling members, said ribs being of substantial peripheral width and having square cut helical thread notches cut therein with a helically wound strainer wire fitting closely in said square thread notches and with the metal of the ribs treated so as to retain said wire within said thread and form of said coupling members, ribs and wire a self-sustaining assembly.

9. A process for making a well strainer which consists in cutting a spiral series of notches in spaced portions of a support, feeding filter wire into the notches as the cutting proceeds, and calking the support portions against the wire as the feeding proceeds.

10. A process for making a well strainer which consists in cutting a spiral series of notches in spaced portions of a support, spacing filter wire in entering relation to the notches as the cutting proceeds, and feeding said wire into the notches as the spacing proceeds, and calking the support portions against the wire as the feeding proceeds.

11. A process for making a well strainer which consists in cutting a spiral series of notches in spaced portions of a support, feeding filter wire into the notches as the cutting proceeds, calking the support portions against the wire as the feeding proceeds, and using the calked-in wire as a guide in the cutting and feeding operations.

12. A well strainer comprising a support with spaced portions having a spiral series of notches cut therein, each with its bottom substantially more than half as wide as its open top, and with substantially straight sides, with the material between notches undisturbed except at the entrance portions of the notches, filter wire fitting tightly between the portions of undisturbed material at the bottoms of the notches, said material being calked against the wire at the entrance portions of the notches, said spaced portions being relatively slender but of substantial width in the direction of cutting of the notches, whereby the wire, due to the undisturbed condition of the material as aforesaid, and due to the substantial cross bearing of the wire in the notches, and due to the low angle of the sides of the notches to the radial direction in which the wire tends to be displaced, substantially reinforces the support portions as well as being supported thereby.

GEORGE E. WILLERS.